Figure 1:
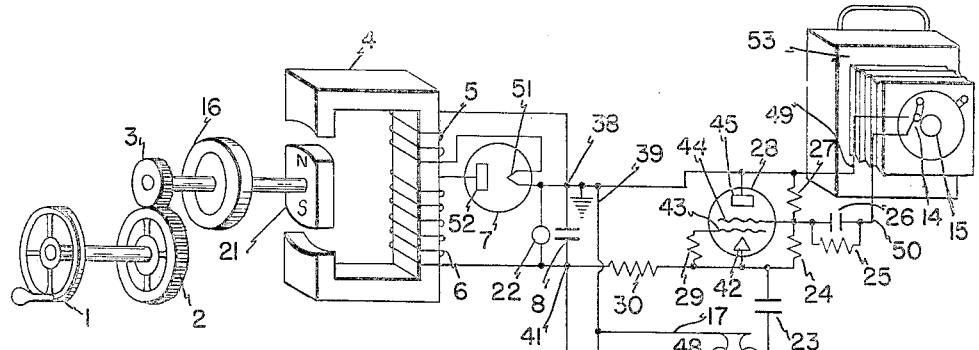
Figure 2:
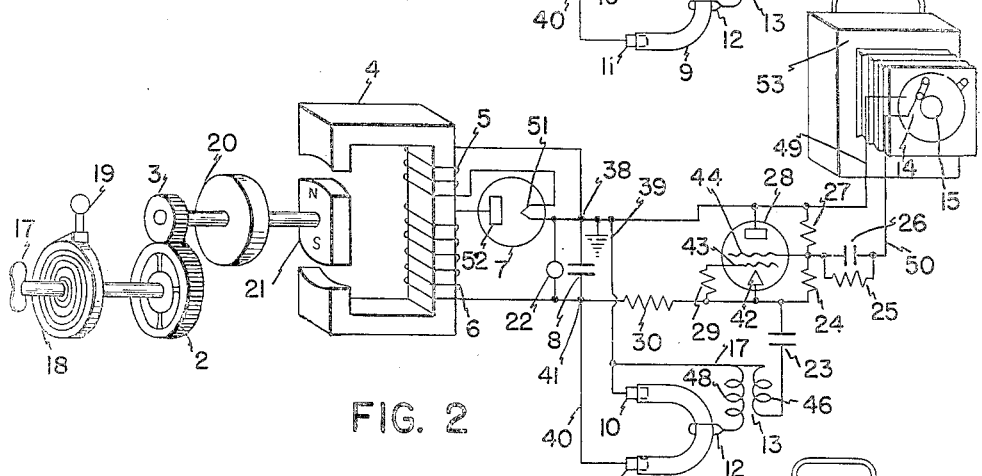

Dec. 4, 1951      H. E. GRIER      2,576,934

FLASH-PHOTOGRAPHY APPARATUS

Filed May 6, 1946      2 SHEETS—SHEET 1

INVENTOR.
HERBERT E. GRIER
BY
ATTORNEY

Dec. 4, 1951     H. E. GRIER     2,576,934
FLASH-PHOTOGRAPHY APPARATUS

Filed May 6, 1946     2 SHEETS—SHEET 2

FIG. 4

FIG. 5

*INVENTOR.*
HERBERT E. GRIER
BY
ATTORNEY

Patented Dec. 4, 1951

2,576,934

UNITED STATES PATENT OFFICE 2,576,934

FLASH-PHOTOGRAPHY APPARATUS

Herbert E. Grier, Newton Centre, Mass.

Application May 6, 1946, Serial No. 667,700

11 Claims. (Cl. 315—218)

The present invention relates to flash-photography, and more particularly to electrical flash-photography in which charged condensers are rapidly discharged through gaseous-discharge flash-lamps.

In the studio, as all conveniences are available, it is possible to supply the power necessary for purposes of such electrical flash-photography from the electrical wiring of the room. In the field, such as in news work, it often occurs that electrical power is unavailable for operating lamps of the above-described character.

An object of the present invention is to improve upon photographic field equipment, in order to enable the field photographer to enjoy the advantages of electrical flash-photography employing gaseous-discharge flash-lamps comparable to those obtaining in the studio.

The use of chemical flash-bulbs has long been recognized as attended with a number of inconveniences resulting from the delay involved in removing one bulb and replacing it by another. Proposals have therefore been made to employ incandescent bulbs, but they have never been successful, and in fact, have constituted backward steps rather than forward.

Another object of the present invention, on the other hand, is to provide a novel field system employing gaseous-discharge flash-lamps, with condensers for discharging therethrough and portable energy sources for charging the condensers.

It has heretofore been proposed, as described in Letters Patent of the United States 2,358,796, issued on September 26, 1944, to Harold E. Edgerton, to solve the problem by mounting upon a portable field camera a self-contained storage battery and a vibrator for converting the power of the battery into alternating current, and with means for reconversion into direct current for charging the condenser. This proposal, however, still requires the photographer to carry as much as some twenty pounds into the field.

A further object of the invention, therefore, is to reduce the weight still further.

A considerable portion of the weight is contributed by the storage battery. The storage battery presents also further problems to photographers who use the apparatus only intermittently, and to those who do not have access to battery-charging or replacement facilities. In recognition of these factors, and in the endeavor to solve some of these problems, the apparatus of the said Letters Patent may be provided also with a means for recharging the battery. This, however, introduces problems of its own, besides adding to the weight of the apparatus as a whole.

Another object of the invention, therefore, is to provide a new and improved system of the above-described character that shall eliminate the storage battery.

With the above ends in view, a feature of the invention resides in a new and improved system comprising, in combination with an electrically operated gaseous-discharge flash-lamp and a flash-condenser for discharging therethrough, a very light portable mechanism with the aid of which the photographer shall be enabled to generate in the field the direct-current energy required to charge the condenser.

According to the Edgerton system of flash photography, it is necessary to provide energy for charging not only the flashing condenser before described, for discharging through the flash-lamp, but also an auxiliary or trip condenser for initiating this discharge. The flashing and auxiliary condensers are charged from the same source of energy.

Still a further object of the invention is accordingly to provide a new and improved system of the above-described character that, in addition to the advantages above described, shall be well adapted for charging a plurality of condensers in parallel.

Other and further objects will be explained hereinafter and will be particularly pointed out in the appended claims.

The invention will now be described more fully in connection with the accompanying drawings, in which Fig. 1 is a diagrammatic view of circuits and apparatus illustrating one embodiment of the invention; and Figs. 2 to 5 are similar views of modifications.

A gaseous-discharge flash-lamp or flashtube comprising a light-transparent vessel 9 is shown provided with an anode 10, a cathode 11 and a high-voltage spark trigger-wire or trip-wire flashing-control electrode 12. The electrode 12 may be of the external type employed at the higher voltages with the larger flash-lamps 9, or it may be of the internal type. The flash-lamp 9 may, if desired, be of the helical or spiral gas-filled type disclosed in Letters Patent 2,277,698, issued to Kenneth J. Germeshausen on March 31, 1942.

The flash-lamp 9 is controlled by a control circuit comprising an energy-storage flash condenser 8, connected to the anode 10 and the cathode 11 of the flashtube or flash-lamp 9. The exposure flash is produced by discharging the condenser 8 through the normally non-conducting gas in the flash-lamp 9, between the anode 10 and the cathode 11, when the gas is rendered conducting. The discharge path may be traced from a grounded terminal 38 at one side of the condenser 8, by way of a conductor 39, through the flash-lamp 9 and, by way of a conductor 40, to a terminal 41 at the other side of the condenser 8. The control electrode 12 thus constitutes part of the means, hereinafter more fully described, coupled to the flash-lamp 9 for impressing a transient high-voltage impulse upon the flash-lamp to render the gas conducting.

A normally non-conducting gaseous-discharge trigger tube 28 for tripping the flash-lamp 9 may be connected to the terminals 38 and 41, in series with an impedance 30, shown as a resistor, and in parallel with the condenser 8. The tube 28 may be of the cold-cathode gaseous-discharge type illustrated and described in Letters Patent 2,185,189, 2,201,166, and 2,201,167, issued to the said Kenneth J. Germeshausen, on January 2, 1940, and May 21, 1940. It may comprise an evacuated glass envelope containing several electrodes, namely, a solid cathode electrode 42, an anode or plate electrode 45, shown grounded to the terminal 38, and one or more grid electrodes, inner and outer grids being shown at 43 and 44, between the anode 45 and the cathode 42. As explained in the said Letters Patent, the source of the electrons is a bright cathode spot on the surface of the cathode 42. An impedance 29 is shown connected between the cathode 42 and the grid 43.

A resistor 24, connected between the cathode 42 and the grid 44, is shown connected in series with a resistor 27, connected between the anode 45 and the grid 44. The resistors 24, 27 and 30 are connected in series to constitute a bleeder resistor across the condenser 8. The parts may be so proportioned that a desired voltage of, say, 300 volts shall appear across the tube 28.

A trigger or discharge circuit for an auxiliary or trip condenser 23 is connected to the electrodes 42 and 45, in parallel with the tube 28. One side of the condenser 23 is connected to the electrode 42. The other side of the condenser 23 is connected to the primary winding 46 of a tripping transformer 13 and, by way of a conductor 17 and the conductor 39, to the grounded electrode 45. The condenser 23 is thus connected in series with the primary winding 46. The secondary winding 48 of the transformer 13 operates as an induction coil. One side of the secondary winding 48 is grounded to the electrode 45 by way of the conductors 17 and 39, and the other side is connected to the trip-wire electrode 12. A return path is afforded by capacity coupling of the trip-wire electrode 12 to the flash-lamp 9. The condenser 23, therefore, becomes charged from the same direct-current source as the condenser 8, through the primary winding 46 and the impedance 30. The charging and the discharge circuits for the condenser 23 thus have the primary winding 46 in common.

A hand-controlled shutter 15 operates a switch 14 for controlling the discharge tube 28. The switch 14, of course, should be synchronized so as to close only when the leaves of the shutter 15 of the camera 53 are fully open. The switch 14 is connected across the anode or plate 45, and the grid or control electrode 44, through a trip condenser 26 and a leak resistor 25, in parallel, by way of conductors 49 and 50. At any time after the direct-current source charges the condenser 8 to its maximum value, the switch 14 may be closed by operating the shutter 15. The potential of the grid 44 will then become raised until the break-down voltage between the grid 44 and the cathode 42, or the grid 44 and the grid 43, is exceeded, whereupon the normally ineffective trigger-tube 28 becomes effective by being rendered conducting. Current then flows through the trigger tube 28, causing the condenser 23, which has become charged from the direct-current source simultaneously with the charging of the condenser 8, to discharge through its before-described condenser-discharge circuit comprising the primary winding 46 of the transformer 13. The resulting voltage-surge pulse of the secondary winding 48 of the transformer 13 becomes thus impressed upon, in order to energize, the trigger electrode 12 of the flash-lamp 9.

The normally non-conducting gas in the flash-lamp 9 thereupon becomes conducting through ionization, providing a conducting path through the flash-lamp 9, permitting the condenser 8 to discharge therethrough between the anode 10 and the cathode 11. The resulting high-voltage spark through the flash-lamp 9 will yield a very brilliant exposure flash of extremely short duration. The time taken between the closing of the switch 14 and the flash of light from the flash-lamp 9 is very brief. It is there possible to produce this very brilliant flash of light at any desired instant, for taking photographs. When the condenser 8 is fully discharged the flash-lamp 9 extinguishes, and the cycle is ready for repetition.

As the instrument is portable, no reliance can be placed upon outside sources of current. Several forms of power supply for charging the flashing condenser 8 and the trip condenser 23 are illustrated. These are all mechanically operable by hand in the field and, though mechanically driven, are all of extremely small weight.

The form illustrated in Fig. 1 comprises a hand-cranked unit the crank 1 of which, through gears 2 and 3, drives the rotor armature 21 of an alternating-current generator the stator of which is shown at 4. The stator or the rotor may be constituted of a permanent magnet. In the illustrated embodiment, the rotor 21 is shown as a permanent magnet. The stator is shown provided with a cathode-filament winding 5 for supplying energy to the filament cathode 51 of a rectifier 7, and an anode or plate power winding 6 for supplying energy to the anode or plate 52 of the rectifier 7. One end of the filament winding 5 is connected to the cathode 51 and the other to the grounded terminal 38. One end of the anode winding 6 is connected to the anode 52 and the other end of the terminal 41. The anode winding 6 being thus connected to the condensers 8 and 23 through the rectifier 7, the alternating current generated by the alternator 21, 4 in the anode winding 6 becomes thus rectified by the rectifier 7, and the rectified voltage becomes thus applied across the terminals 38 and 41 to charge the condensers 8 and 23. An indicator 22, connected across the terminals 38 and 41, serves to inform the operator when the condensers have become sufficiently charged.

The flash-producing system thus provides two common terminals 38 and 41 for the main condenser 8 and the trigger circuit comprising the auxiliary condenser 23. The connections are such that the condenser 23 is charged in series with the impedance 30. The part 30 of the bleeder resistor 24, 27, 30 is therefore connected in parallel with the auxiliary condenser 23. Direct current for charging the two condensers 8 and 23 is supplied to these two circuits by the plate winding 6. The impedance of the winding 6 may be sufficiently high so that, after the condenser 8 has discharged through the flash-lamp 9, further current flow between the anode 10 and the cathode 11 will be prevented until after the gas in the flash-lamp 9 shall again have been rendered conducting, thus eliminating the necessity for the use of a separate charging resistor or other impedance between the winding 6 and the condensers. The proper charging rate of the condenser 8 and consequent proper flashing of the tube 9 are thus obtained, notwithstanding the absence of such separate condenser-charging resistor or other impedance. The winding 6 may be designed with due regard to the characteristics of the tube 9 and the interval of time desired between the flashes thereof. The winding 6 should be so designed, with sufficient inductance impedance, that the short-circuit current shall be limited not to exceed the peak rating of, in order not to overload, the associated rectifier 7. Excessive current flow during the charging of the condenser 8 is thus prevented.

Sufficient power may be supplied, in this manner, to a flashing condenser 8 large enough to impress a suitably high voltage, between the anode 10 and the cathode 11 of the flash-lamp 9, so as to produce a very brilliant sharp flash of high intensity, in response to the closing of the switch 14. There is no difficulty, through the medium of this apparatus, in charging the condenser 8 to a voltage of, say, 2000 volts. At this voltage, a condenser of 28 microfarads is very satisfactory.

To assure constant intensity of light, the voltage output of the generator 21, 4 is shown regulated by a slip clutch 16, interposed between the gears 2, 3 and the rotor 21. The slip clutch 16 will maintain the generator speed substantially constant even though the crank 1 be turned fast enough so as to tend to overdrive the generator.

If it is preferred to eliminate the cathode winding 5, this may be effected in any of several ways. The rectifier 7 may, for example, be of the cold-cathode type illustrated in Fig. 5 at 37. The rectifier 37 may be a cold-cathode-gas tube, or it may be constituted of selenium. If desired, a low-voltage alternator 21, 4 may be used, as illustrated in Fig. 4. In that event, however, it would be necessary to step up the voltage through the medium of an additional transformer. Such an additional transformer may be employed also in connection with a high-voltage alternator. It is shown in Fig. 4 provided with a primary winding 34 connected to the winding 6, a core 36 and a secondary winding 35, shown connected to the anode 52 and the terminal 41. The rectifier 7 and the cathode winding 5 may also be eliminated by substituting for the alternator 21, 4 a direct-current generator provided with a rotor-armature winding 32 and a permanent-field-magnet stator 33, Fig. 3.

The hand crank 1 of Fig. 1 may be replaced by some other source of power for the alternator, such as a predetermined-storage-energy-capacity spring motor 18, Figs. 2 to 5, that may be hand-wound at will, by means of a key 17, and that may be maintained in wound condition by means of a trigger 19. This makes it unnecessary to be compelled to turn the crank 1 of Fig. 1 for the purpose of generating the power for charging the condensers 8 and 23 at exactly the time that it is desired to make the photographic exposure, as the spring motor 18 may be hand-wound by means of the key 17 at any earlier time.

At the time that the photographer desires to take the picture, he then merely releases the spring 18 by means of the trigger 19. The motor 18 thereupon drives the alternator rotor 21 or the direct-current-generator rotor 32, to which it is connected, thereby charging the condenser 8; in the former case, through the rectifier 7, and in the latter directly. The photographer then trips the shutter 15 which, in turn, through the switch 14 and the trip transformer 13, effects a discharge of the condenser 8 through the lamp 9, thereby to produce an exposure flash, synchronized with the operation of the shutter 15, for supplying light to illuminate the scene being photographed.

It is not necessary to operate the mechanical portion of the system immediately prior to the flashing of the light, because the bleeder resistor 24, 27, 30 for the condenser 8 and the part 30 of the bleeder resistor for the condenser 23 may be designed of sufficiently high value so that, after the condensers 8 and 23 have become charged, they will retain the voltage thus impressed upon them for substantial periods of time.

It may be desirable to provide a governor 20, the better to approximate to constant speed during the running down of the spring 18. Further gearing, not shown, moreover, may be connected between the spring motor 18 and the generator 21, 4 or 32, 33 in order to adjust the speed of the rotor 21 or 32 to a suitable value.

Figure 3:
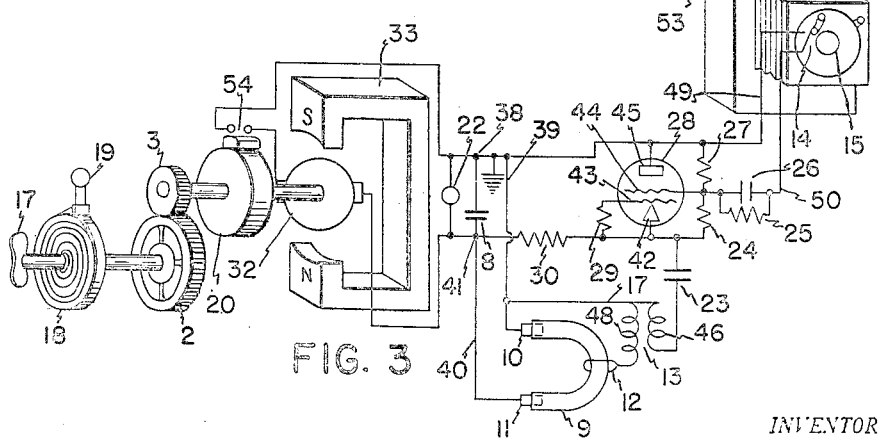

In the case of the direct-current generator shown in Fig. 3, the speed governor 20 may be so constructed that, when the armature 32 is rotating, a switch 54 is closed by the governor 20 for connecting the armature 32 to the condenser 8. When the armature 32 stops, however, the switch 54 automatically opens, thereby preventing the condenser 8 from discharging back through the armature winding.

Direct-current generators, however, are not economical at the high voltages required in connection with flash-lamps of the above-described character. As before stated, this voltage may be as high as 2000. It is preferred, therefore, to employ alternating-current generators the alternating voltage of which is rectified by rectifiers.

Further modifications will occur to persons skilled in the art, and all such are considered to fall within the spirit and scope of the invention as defined in the appended claims.

What is claimed is:

1. The portable combination of a condenser, a generator having a rotor and a stator one of which comprises a permanent magnet, a manually operable spring motor of predetermined storage-energy capacity, means connecting the spring motor to the rotor, means connecting the generator to the condenser to charge the condenser from the generator, a gaseous-discharge flash lamp comprising a light-transparent vessel containing a gas, an anode and a cathode disposed in the gas and a control electrode, means connecting the condenser to the anode and the cathode, and means for energizing the control electrode to cause the condenser, after it has become charged from the generator, to discharge between the anode and the cathode through the gas to produce a flash.

2. Apparatus for use in flash-photography with the aid of a camera provided with a shutter having, in combination, a gaseous-discharge flash-lamp, an energy-storage condenser to discharge through the flash lamp, and charging means for the energy-storage condenser comprising an alternator and a rectifier with a suitable filament winding on the alternator for the rectifier filament and with sufficient inductive impedance in the alternator power winding to limit the charging current so as to not overload the rectifier, a primary source of power for the alternator consisting of a spring motor that may be operated at will to charge the energy-storage condenser, triggering means connected in parallel with the energy-storage condenser comprising an impedance in series with an auxiliary condenser and a tripping transformer and with a trigger tube having a control electrode in parallel with the auxiliary condenser and the trigger transformer, and synchronizing means comprising a switch actuated by the shutter for controlling the control electrode to discharge the auxiliary condenser through the tripping transformer and thus ionizing the flash-lamp, thereby allowing the energy-storage condenser to discharge through the flash-lamp in order to produce a brilliant flash of light synchronized with the shutter.

3. Apparatus for use in flash-photography with the aid of a camera provided with a shutter having, in combination, a gaseous-discharge flash-lamp, an energy-storage condenser to discharge through the flash-lamp, and charging means for the energy-storage condenser comprising an alternator and a rectifier with sufficient inductive impedance in the alternator winding to limit the charging current so as to not overload the rectifier, a manually operable primary source of power for the alternator that may be operated at will to charge the energy-storage condenser, triggering means consisting of the series combination of an impedance, an auxiliary condenser and a tripping transformer connected in parallel to the energy-storage condenser, a switch actuated in synchronism with the shutter connected in parallel with the auxiliary condenser and the tripping transformer to discharge the auxiliary condenser through the tripping transformer and thus ionizing the flash-lamp, thereby allowing the energy-storage condenser to discharge through the flash lamp in order to produce a brilliant flash of light synchronized with the shutter.

4. Portable flash-producing apparatus for illuminating an object during a very brief period of time having, in combination, a condenser, a generator having a manually operable rotor and a stator one of which comprises a permanent magnet, the generator being provided with a winding, means connecting the winding to the condenser to charge the condenser from the generator in response to the manual operation of the rotor, a flash-lamp comprising a light-transparent vessel containing a normally non-conducting gas and an anode and a cathode disposed in the gas, means connecting the condenser to the anode and the cathode, and means coupled to the flash-lamp for impressing a transient high-voltage impulse upon the flash-lamp to render the gas conducting, thereby enabling the condenser, after it has become charged from the generator, to discharge through the gas between the anode and the cathode in order to produce a very brilliant flash of light for a very brief period of time during which to illuminate the object, the inductive impedance of the winding being sufficiently high to prevent excessive current flow during the charging of the condenser.

5. Portable flash-producing apparatus for illuminating an object during a very brief period of time having, in combination, a condenser, a generator having a rotor and a stator one of which comprises a permanent magnet, a manually operable spring motor of predetermined storage-energy capacity, a slip-clutch connection between the spring motor and the rotor, means connecting the generator to the condenser to charge the condenser from the generator in response to the operation of the rotor, a flash-lamp comprising a light-transparent vessel containing a normally non-conducting gas and an anode and a cathode disposed in the gas, means connecting the condenser to the anode and the cathode, and means coupled to the flash-lamp for impressing a transient high-voltage impulse upon the flash-lamp to render the gas conducting, thereby enabling the condenser, after it has become charged from the generator, to discharge through the gas between the anode and the cathode in order to produce a very brilliant flash of light for a very brief period of time during which to illuminate the object.

6. Portable flash-producing apparatus for illuminating an object during a very brief period of time having, in combination, a condenser, a generator having a rotor and a stator one of which comprises a permanent magnet, a manually operable spring motor of predetermined storage-energy capacity, means connecting the spring motor to the rotor, means connecting the generator to the condenser to charge the condenser from the generator in response to the operation of the rotor, a flash-lamp comprising a light-transparent vessel containing a normally non-conducting gas and an anode and a cathode disposed in the gas, means connecting the condenser to the anode and the cathode, and means coupled to the flash-lamp for impressing a transient high-voltage impulse upon the flash-lamp to render the gas conducting, thereby enabling the condenser, after it has become charged from the generator, to discharge through the gas between the anode and the cathode in order to produce a very brilliant flash of light for a very brief period of time during which to illuminate the object.

7. Portable flash-producing apparatus for illuminating an object during a very brief period of time having, in combination, a condenser, a generator having a rotor and a stator one of which comprises a permanent magnet, a manually operable spring motor of predetermined storage-energy capacity, means connecting the spring motor to the rotor, a governor connected between the spring motor and the rotor, means connecting the generator to the condenser to charge the condenser from the generator in response to the operation of the rotor, a flash-lamp comprising a light-transparent vessel containing a normally non-conducting gas and an anode and a cathode disposed in the gas, means connecting the condenser to the anode and the cathode, and means coupled to the flash-lamp for impressing a transient high-voltage impulse upon the flash-lamp to render the gas conducting, thereby enabling the condenser after it has become charged from the generator, to discharge through the gas between the anode and the cathode in order to produce a very brilliant flash of light for a very brief period of time during which to illuminate the object.

8. Portable flash-producing apparatus for illuminating an object during a very brief period of time having, in combination, a two-terminal condenser, an alternator having a manually operable rotor and a stator one of which comprises a permanent magnet, the alternator being provided with two windings, a rectifier provided with a cathode and an anode, means connecting one of the windings to the cathode and one of the condenser terminals and the other winding to the anode and the other condenser terminal to supply energy to the cathode and to charge the condenser from the alternator in response to the manual operation of the rotor, a flash-lamp comprising a light-transparent vessel containing a normally non-conducting gas and an anode and a cathode disposed in the gas, means connecting the condenser to the anode and the cathode of the flash-lamp, and means coupled to the flash-lamp for impressing a transient high-voltage impulse upon the flash lamp to render the gas conducting, thereby enabling the condenser, after it has become charged from the alternator, to discharge through the gas between the anode and the cathode of the flash-lamp in order to produce a very brilliant flash of light for a very brief period of time during which to illuminate the object, the inductive impedance of the said other winding being sufficiently high to limit the short-circuit current to below the peak rating of the rectifier.

9. Portable flash-producing apparatus for illuminating an object during a very brief period of time having, in combination, a condenser, a generator having a rotor and a stator one of which comprises a permanent magnet, the generator being provided with a winding, a manually operable spring motor of predetermined storage-energy capacity, means connecting the spring motor to the rotor, means connecting the winding to the condenser to charge the condenser from the generator in response to the operation of the rotor, a flash-lamp comprising a light-transparent vessel containing a normally non-conducting gas and an anode and a cathode disposed in the gas, means connecting the condenser to the anode and the cathode, a triggering circuit, and means for operating the triggering circuit to render the gas conducting, thereby enabling the condenser, after it has become charged from the generator, to discharge through the gas between the anode and cathode in order to produce a very brilliant flash of light for a very brief period of time during which to illuminate the object, the inductive impedance of the winding being sufficiently high to prevent excessive current flow during the charging of the condenser.

10. Portable flash-producing apparatus for illuminating an object during a very brief period of time having, in combination, a condenser, a generator having a rotor and a stator one of which comprises a permanent magnet, a manually operable spring motor of predetermined storage-energy capacity, means connecting the spring motor to the rotor, a bleeder resistor connected in parallel with the condenser, means connecting the generator to the condenser to charge the condenser from the generator in response to the operation of the rotor, a flash-lamp comprising a light-transparent vessel containing a normally non-conducting gas and an anode and a cathode disposed in the gas, means connecting the condenser to the anode and the cathode, and means coupled to the flash-lamp for impressing a transient high-voltage impulse upon the flash-lamp to render the gas conducting, thereby enabling the condenser, after it has become charged from the generator, to discharge through the gas between the anode and the cathode in order to produce a very brilliant flash of light for a very brief period of time during which to illuminate the object, the resistance of the bleeder resistor being sufficiently high to cause the condenser to retain its charge for a substantial period of time after it has become charged.

11. Portable flash-producing apparatus for illuminating an object during a very brief period of time having, in combination, a flash condenser, an auxiliary condenser, a generator having a rotor and a stator one of which comprises a permanent magnet, a manually operable spring motor of predetermined storage-energy capacity, means connecting the spring motor to the rotor, a bleeder resistor connected in parallel with the flash condenser and part of which is connected in parallel with the auxiliary condenser, means connecting the generator to the condensers to charge the condensers from the generator in response to the operation of the rotor, a flash-lamp comprising a light-transparent vessel containing a normally non-conducting gas and an anode and a cathode disposed in the gas, means connecting the flash condenser to the anode and the cathode, means for discharging the auxiliary condenser after it has become charged from the generator, and means coupled to the flash-lamp and controlled by the discharge of the auxiliary condenser for impressing a high-voltage impulse upon the flash-lamp to render the gas conducting, thereby enabling the flash condenser, after it has become charged from the generator, to discharge through the gas between the anode and the cathode in order to produce a very brilliant flash of light for a very brief period of time during which to illuminate the object, the resistance of the bleeder resistor and of the said part of the bleeder resistor being sufficiently high to cause the respective condensers to retain their charges for a substantial period of time after they have become charged.

HERBERT E. GRIER.

REFERENCES CITED

The following references are of record in the file of this patent:

UNITED STATES PATENTS

| Number | Name | Date |
|---|---|---|
| Re. 22,260 | Edgerton | Feb. 2, 1943 |
| 472,193 | Marshall | Apr. 5, 1892 |
| 635,276 | Cutten | Oct. 17, 1899 |
| 1,168,346 | Thomson | Jan. 18, 1916 |
| 2,071,958 | Watrous | Feb. 23, 1937 |
| 2,147,472 | Ulrey | Feb. 14, 1939 |
| 2,250,102 | Klemperer | July 22, 1941 |
| 2,295,293 | Rogers | Sept. 8, 1942 |
| 2,299,497 | Rosenthal | Oct. 20, 1942 |
| 2,315,093 | Languepin | Mar. 30, 1943 |
| 2,341,541 | Grier | Feb. 15, 1944 |
| 2,358,796 | Edgerton | Sept. 26, 1944 |
| 2,385,397 | Blackburn | Sept. 25, 1945 |
| 2,385,736 | Smith et al. | Sept. 25, 1945 |
| 2,389,514 | Kennedy | Nov. 20, 1945 |
| 2,409,967 | Weisglass | Oct. 22, 1946 |
| 2,447,296 | Wall | Aug. 17, 1948 |